United States Patent
Sakata (10) Patent No.: US 10,061,737 B2
(45) Date of Patent: Aug. 28, 2018

(54) SIGNAL PROCESSING DEVICE, METHOD OF SIGNAL PROCESSING, STORAGE MEDIUM, AND ELECTRONIC MUSICAL INSTRUMENT

(71) Applicant: CASIO COMPUTER CO., LTD., Tokyo (JP)

(72) Inventor: Goro Sakata, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 231 days.

(21) Appl. No.: 15/058,380

(22) Filed: Mar. 2, 2016

(65) Prior Publication Data
US 2016/0283431 A1   Sep. 29, 2016

(30) Foreign Application Priority Data
Mar. 23, 2015   (JP) .................................. 2015-059116

(51) Int. Cl.
*G06F 13/42* (2006.01)
*G06F 13/16* (2006.01)

(52) U.S. Cl.
CPC ...... *G06F 13/4234* (2013.01); *G06F 13/1636* (2013.01)

(58) Field of Classification Search
CPC .... G06F 13/385; G06F 13/28; G06F 12/1081; G06F 2212/206

USPC ............................................................. 710/3
See application file for complete search history.

(56) References Cited

U.S. PATENT DOCUMENTS

| | | | | |
|---|---|---|---|---|
| 7,058,882 B2* | 6/2006 | Kobayashi | ....... | G11B 20/10527 381/119 |
| 7,573,510 B2* | 8/2009 | Iijima | ..................... | H04N 5/772 348/231.1 |
| 7,734,860 B2* | 6/2010 | Sakata | ................... | G06F 13/161 700/4 |
| 8,035,021 B2* | 10/2011 | Shirahama | ............. | G10H 1/183 84/605 |
| 9,000,284 B2* | 4/2015 | Nagasaka | ................ | G10H 7/02 84/604 |
| 9,112,622 B2* | 8/2015 | Miyata | ..................... | H04R 3/00 |
| 9,165,563 B2* | 10/2015 | Sakata | ..................... | G10L 19/04 |

FOREIGN PATENT DOCUMENTS

JP        3629693 B2    3/2005

* cited by examiner

*Primary Examiner* — Brian T Misiura
(74) *Attorney, Agent, or Firm* — Chen Yoshimura LLP (57) ABSTRACT

A double buffer (four pages×2 system) constituted by a DSP program buffer (D-RAM) and a prefetch program buffer (D-RAM) is provided, and burst access is performed collectively for four samplings from the prefetch program buffer (D-RAM). When this burst access is performed, a decline in performance caused by latency that occurs each time an external memory (DDR-SDRAM) is accessed is avoided by accessing with sequential addresses.

15 Claims, 10 Drawing Sheets

SIGNAL PROCESSING DEVICE, METHOD OF SIGNAL PROCESSING, STORAGE MEDIUM, AND ELECTRONIC MUSICAL INSTRUMENT

BACKGROUND OF THE INVENTION

Field of the Invention

The present invention relates to a signal processing device, a method of signal processing, a storage medium, and an electronic musical instrument, the signal processing device being suitable for use in a sound source.

In an electronic musical instrument, a signal processing device referred to as a digital signal processor (DSP) is often included in a sound source. The DSP (signal processing device) is configured to sequentially read, at each prescribed sampling period, waveform data stored in an external memory, subject the read waveform data to a delay feedback operation or filter operation to form a musical sound waveform, and apply an effect (sound effect) such as reverberation to that formed musical sound waveform.

In this type of signal processing device, it is common for the external memory access time to be slower than that for internal memory. Consequently, when the external memory is frequently accessed to read/write data, a decline in the overall processing speed of the device is likely to occur due to latency (delay) that occurs when the external memory is accessed.

Therefore, conventionally, as in the technology disclosed in Japanese Patent No. 3629693, in synchronization with a time slot in which a first processing unit is not occupying an internal memory, a second processing unit writes data read from an external memory to the internal memory or writes data read from the internal memory to the external memory. Thus, when seen from the first processing unit, the external memory operates as though part of the internal memory, and an improvement in the overall processing speed of the device is achieved.

In this connection, in the electronic musical instruments of recent years, there has been a continued increase in the functions of signal processing devices, such as a standard effect based on a signal delay such as chorus and reverberation being applied to a plurality of musical parts (sound channels) and, at the same time, respectively different types of effects being applied via time division to other musical parts (sound channels).

However, a reduction in product cost is sought with relatively low-speed general-purpose devices being used for the external memories provided for signal delay in such signal processing devices, and also with it being possible for the external memories to be shared by each part of the device.

Figure 10:
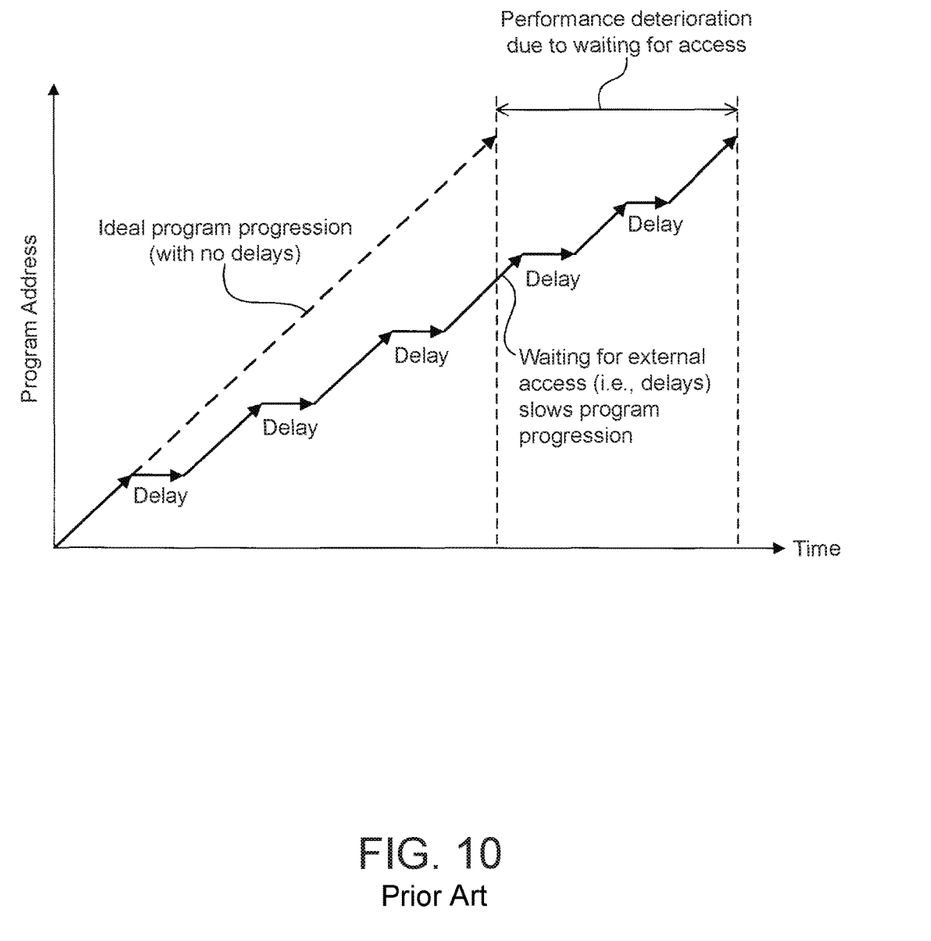
FIG. 10 is a drawing for describing a conventional example.

In a signal processing device, a program generally progresses at one instruction per one clock. Consequently, a program address that is counted by a program counter changes in a linear manner as shown in FIG. 10 as long as the progression is ideal without there being inhibiting factors such as stops or faults. However, when an external memory constituted by a relatively low-speed general-purpose device is used to perform the signal delay processing that is necessary for effects, as shown in FIG. 10, there is a problem in that there is likely to be a decline in performance due to latency (delay) that occurs each time the external memory is accessed.

In addition, with a memory that has a large capacity yet is relatively cheap such as NAND flash and DDR-SDRAM, it is known that latency (delay) increases when random access is performed compared to when data that is stored in consecutive addresses is accessed.

SUMMARY OF THE INVENTION

The present invention has been devised in view of such circumstances, and aims at providing a signal processing device, a method of signal processing, a storage medium, and an electronic musical instrument, with which it is possible to avoid a decline in performance caused by waiting for access even when an external memory is used to perform signal delay processing. Accordingly, the present invention is directed to a scheme that substantially obviates one or more of the above-discussed and other problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a signal processing device, including: a first memory controller that reads a plurality of sampling data stored in respective sequential addresses in a first memory, in the order of the addresses, and writes each of the plurality of read sampling data to respective sequential addresses in a second memory, in a sequential order; a processing unit that processes the plurality of sampling data written in the second memory, and writes the plurality of processed sampling data to the second memory; and a second memory controller that reads, from the second memory, the plurality of processed sampling data, and writes each of the plurality of read sampling data to the respective sequential addresses in the first memory, in a sequential order.

Furthermore, in another aspect, the present disclosure provides a signal processing device, including: an external memory; a processing unit; and a bus that connects the external memory to the processing unit, wherein the processing unit includes: an internal memory; a first memory controller that reads a plurality of sampling data stored in first regions respectively designated by sequential addresses in the external memory, in the order of the addresses, and writes each of the plurality of read sampling data to respective sequential addresses in the internal memory via the bus, in a sequential order; a processing unit that executes processing for applying an effect for respective sampling periods to the plurality of sampling data that is written in the internal memory and writes the plurality of processed sampling data to the internal memory; and a second memory controller that reads, from the internal memory, the plurality of processed sampling data and, via the bus, writes each of the read sampling data to second regions respectively designated by sequential addresses in the external memory, in a sequential order.

Furthermore, in another aspect, the present disclosure provides a method of processing a signal in a signal processing device, the method including: reading a plurality of sampling data stored in respective sequential addresses in a first memory, in the order of the addresses, and writing each of the plurality of read sampling data to respective sequential addresses in a second memory, in a sequential order;

processing the plurality of sampling data written in the second memory and writing the plurality of processed sampling data to the second memory; and reading, from the second memory, the plurality of processed sampling data and writing each of the plurality of read sampling data to the respective sequential addresses in the first memory, in a sequential order.

In another aspect, the present disclosure provides a non-transitory storage medium that can be read and written by a computer used as a signal processing device, the non-transitory storage medium having stored therein a program that causes the computer to execute the following: reading a plurality of sampling data stored in respective sequential addresses in a first memory, in the order of the addresses, and writing each of the read plurality of sampling data to respective sequential addresses in a second memory, in a sequential order; processing the plurality of sampling data written in the second memory and writing the plurality of processed sampling data to the second memory; and reading, from the second memory, the plurality of processed sampling data and writing each of the plurality of read sampling data to the respective sequential addresses in the first memory, in a sequential order.

It is to be understood that both the foregoing general description and the following detailed description are exemplary and explanatory, and are intended to provide further explanation of the invention as claimed.

DETAILED DESCRIPTION OF THE EMBODIMENTS

Figure 1:
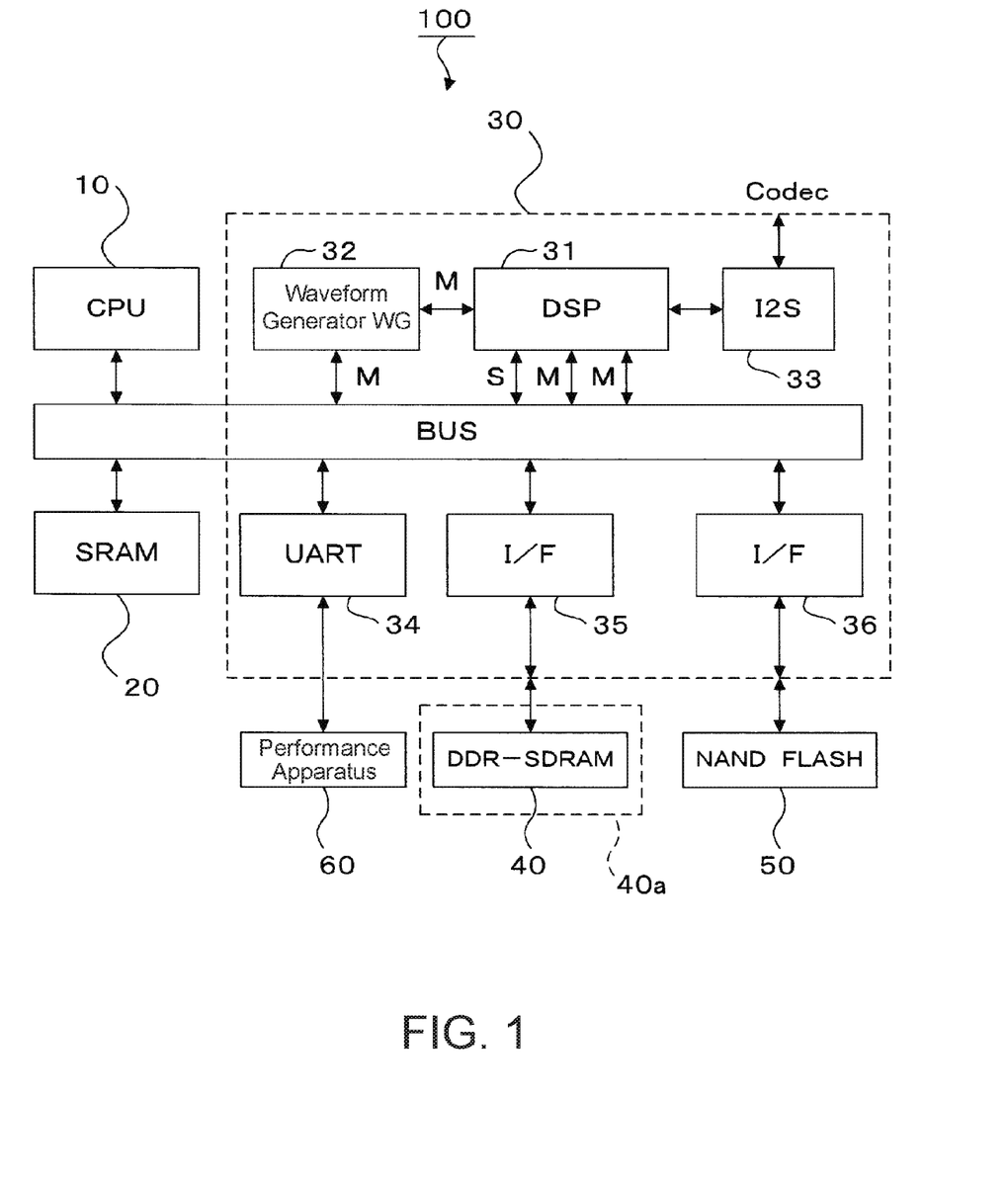
FIG. 1 is a block diagram showing a configuration of a musical instrument system 100 that is an embodiment of the present invention.

Hereinafter, an embodiment of the present invention will be described with reference to the drawings.
<Overall Configuration>
FIG. 1 is a block diagram showing an overall configuration of a musical instrument system 100 that is an embodiment of the present invention. The musical instrument system 100 shown in this drawing is configured from a CPU 10, an SRAM 20, a sound source 30, a DDR-SDRAM 40 serving as a first memory 40a, and a NAND flash 50. The CPU 10 controls the sound source 30 in accordance with various programs stored in the SRAM 20. Specifically, the CPU 10 instructs a DSP 31 of the sound source 30 to generate a musical sound waveform and apply an effect, in accordance with MIDI data that indicates note-on/note-off events and the like, which constitute performance information received by way of a universal asynchronous receiver transmitter (UART) 34 of the sound source 30. A performance operation element 60 such as a keyboard, for example, is connected to this UART.

The sound source 30 reads and transfers waveform table data from the NAND flash 50 to the DDR-SDRAM 40 when activated or as necessary. Note that the DDR-SDRAM 40 is an SDRAM including a double data rate (DDR) mode that enables the reading/writing of data both when a clock rises and when a clock falls. In the sound source 30, a musical waveform based on waveform data of various timbres is generated with reference to the waveform table data stored in the DDR-SDRAM 40, after which an effect such as chorus or reverberation is applied to the musical sound waveform, and the musical sound waveform is output.

The sound source 30 includes the DSP 31, a waveform generator 32, an Inter-IC Sound (I2S) 33, the UART 34, a DDR-SDRAM interface 35, and a NAND flash interface 36. The waveform generator 32 is configured using a known waveform memory reading system, and generates musical waveform data of each of a plurality of sound channels that generate sound at the same time on the basis of the waveform data of various timbres read with reference to the waveform table data stored in the DDR-SDRAM 40.

In the DSP 31, together with instructions from the CPU 10 being supplied from a slave port S, musical waveform data of each sound channel output by the waveform generator 32 is received by way of a master port M. Furthermore, in the DSP 31, from among the received musical waveform data of each sound channel, musical waveform data of a sound channel to which an effect relating to signal delay such as reverberation is to be applied is sent to the DDR-DRAM 40 via the master port M. The musical sound waveform that is subjected to a signal delay by writing/reading in this DDR-SDRAM 40 is returned once again to the DSP 31 via the master port M.

The DSP 31 outputs the musical sound waveform data of each sound channel to the Inter-IC Sound (I2S) 33. The I2S 33 externally outputs the musical sound waveform data of each sound channel supplied from the DSP 31, in an I2S format. Specifically, the musical sound waveform is input to a D/A conversion unit of a sound system not shown in the drawings, and converted into an analog-form musical sound waveform.

Figure 2:
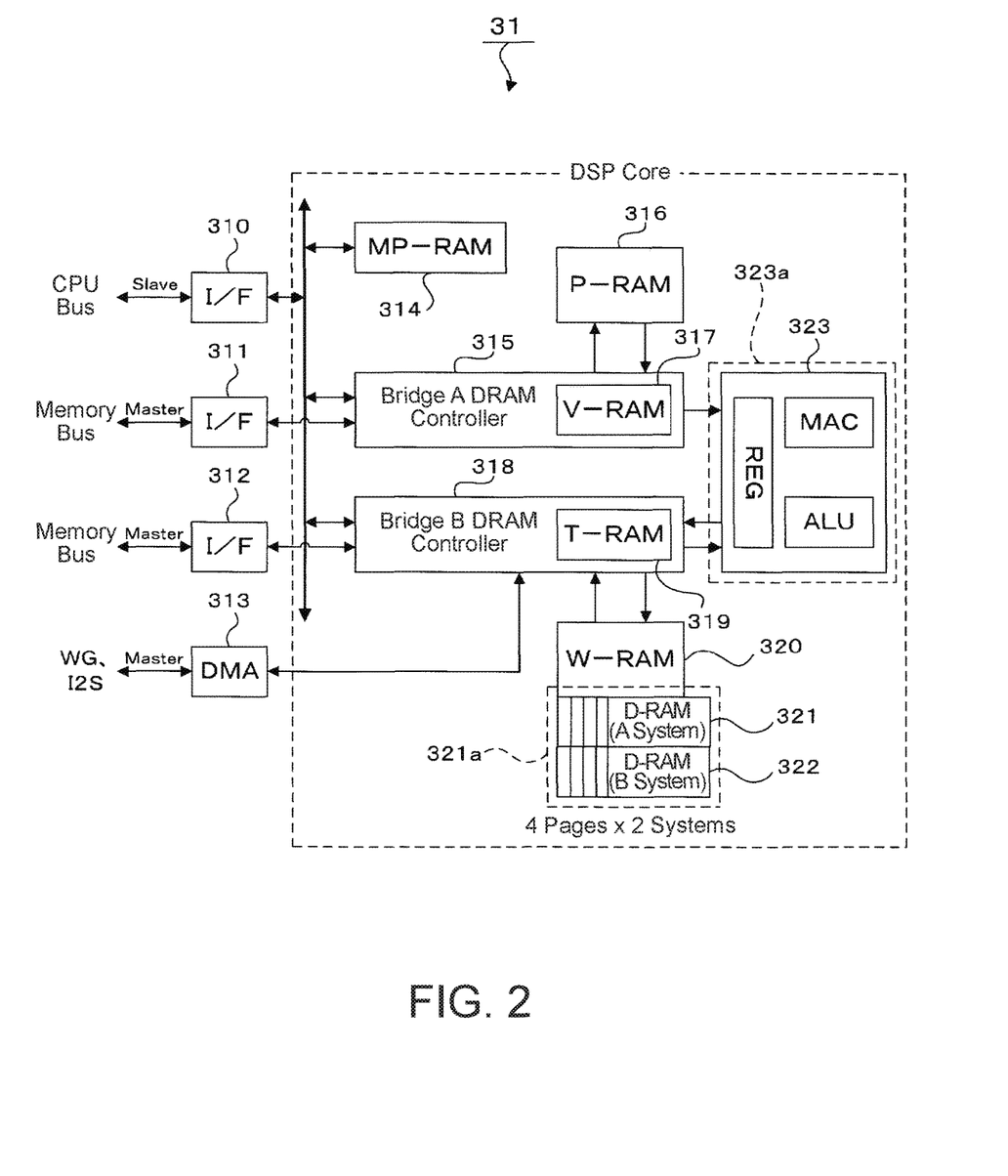
FIG. 2 is a block diagram showing a configuration of a DSP 31.

<Configuration of DSP 31>
Next, a configuration of the DSP 31 will be described with reference to FIG. 2. FIG. 2 is a block diagram showing a configuration of the DSP 31. In this drawing, an interface 310 performs I/O control as the slave port S of a CPU bus. An interface 311 performs I/O control as the master port M of a memory bus of a bridge A DRAM controller 315.

An interface 312 performs I/O control as the master port M of a memory bus of a bridge B DRAM controller 318. A DMA controller 313 DMA-transfers musical sound waveform data generated by the waveform generator 32 (see FIG. 1) to the bridge B DRAM controller 318 side, and DMA-transfers musical sound waveform data to which a delay has been applied at the bridge B DRAM controller 318 side, to the I2S 33 (see FIG. 1).

An MP-RAM 314 stores a DSP program supplied from the CPU 10 by way of the interface 310. A calculation unit 323 described hereinafter executes waveform signal processing in accordance with this DSP program. In addition, the bridge A DRAM controller 315 and the bridge B DRAM controller 318 described hereinafter supply various parameters and musical sound waveform data required for the waveform signal processing to the calculation unit 323.

The bridge A DRAM controller 315 supplies parameters for waveform signal processing stored in a P-RAM 316 and parameters for interpolation processing stored in a V-RAM 317 to the calculation unit 323. In accordance with a prefetch subprogram for delay signal processing stored in a T-RAM 319, the bridge B DRAM controller 318 reads/writes musical sound waveform data that is DMA-transferred from the DMA controller 313 to an external memory (DDR-SDRAM 40) that functions as a ring buffer, thereby applying a delay to the musical sound waveform data.

A W-RAM 320 is used as a work area for the calculation unit 323 described hereinafter. A D-RAM (A system) 321 and a D-RAM (B system) 322, which constitute a second memory 321a of the invention of the present application, function as mirroring buffers for the DDR-SDRAM 40. In the present embodiment, the D-RAM (A system) 321 and the D-RAM (B system) 322 forming a four pages×2 system are used, and a prefetch (preread) for a plurality of samplings is performed in a plurality of sampling periods to avoid collision with the DSP program progression. Specifically, a double buffer (four pages×2 system) constituted of a DSP program buffer and a prefetch program buffer is provided, and burst access is performed collectively for four samplings from the prefetch program buffer, thereby avoiding a decline in performance caused by latency (delay) that occurs each time the external memory is accessed.

The calculation unit 323 that serves as a processing unit 323a of the invention of the present application includes an arithmetic logic unit ALU, a multiplier-accumulator MAC, and a register REG, subjects the waveform data of each sampling period to a delay feedback operation or filter operation to form musical sound waveform data with the W-RAM 320, or namely the D-RAM (A system) 321 and D-RAM (B system) 322 serving as a work area, and subjects the formed musical sound waveform data to delay signal processing to apply an effect such as reverberation. The musical sound waveform data to which an effect has been applied by the calculation unit 323 is DMA-transferred from the bridge B DRAM controller 318 to the I2S 33 via the DMA controller 313 (see FIG. 1).

<Memory Configuration of DDR-SDRAM 40>

Figure 3:
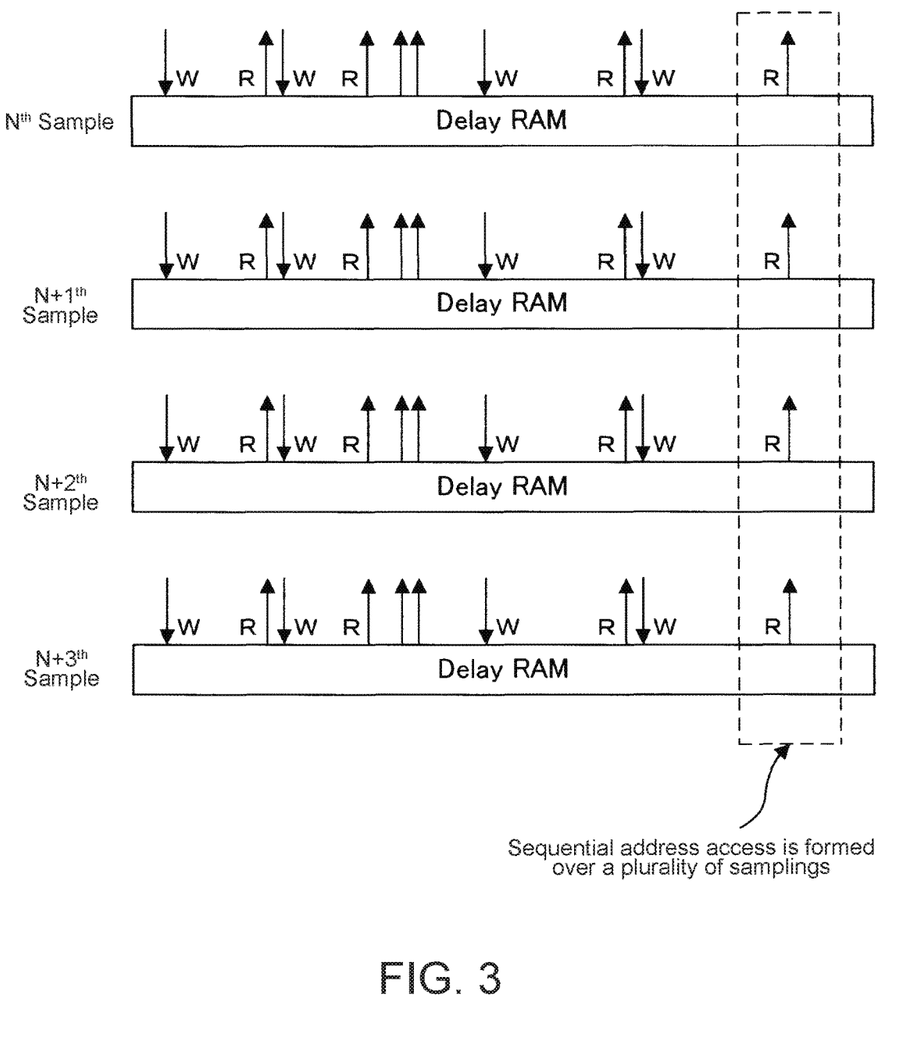
FIG. 3 is a drawing schematically showing address changes of an external memory (DDR-SDRAM 40) that functions as a ring buffer.

Next, a memory configuration of the DDR-SDRAM 40 will be described with reference to FIG. 3. FIG. 3 is a drawing schematically showing address changes of the DDR-SDRAM 40, which functions as a ring buffer. This drawing expresses a cyclic address space of an actual ring buffer as a delay memory (delay RAM) that includes a first dimensional address space, and shows a state in which this is arranged side-by-side in a time-sequential manner (sampling timing order).

In this type of delay memory (delay RAM), a write W/read R of the data of an $N^{th}$ sample is performed in a plurality of addresses that correspond to delay times to be applied. Access at these plurality of addresses is discrete and is not consecutive in order to handle the delay times to be applied. When looking at sampling timings N+1, N+2, and N+3, although the same access pattern as that of the $N^{th}$ sample is repeated, with a ring buffer, each address increases at each sampling. When looking at one sampling unit, the addresses are comparatively discrete, but when looking at a plurality of samplings, it is possible to discern sequential address changes. Hence, the present invention is characterized in that burst access is performed collectively for sequential addresses over these plurality of samplings.

More specifically, if the read R addresses in FIG. 3 surrounded by the dotted line are A when the sampling timing is $N^{th}$, for example, then at N+1 the addresses are A+1, at N+2 the addresses are A+2, and at N+3 the addresses are A+3. It is known that, for an ordinary delay memory, it is faster to sequentially access the data stored in sequential addresses than to randomly access this data. Therefore, in the present invention, the first memory controller (described later) sequentially accesses a plurality of sampling data stored in sequential addresses from the delay memory corresponding to the first memory and writes this plurality of sampling data to the D-RAM (A system) 321 and D-RAM (B system) 322 corresponding to the second memory.

<Memory Configuration of D-RAM (A System) 321 and D-RAM (B System) 322>

Figure 4:
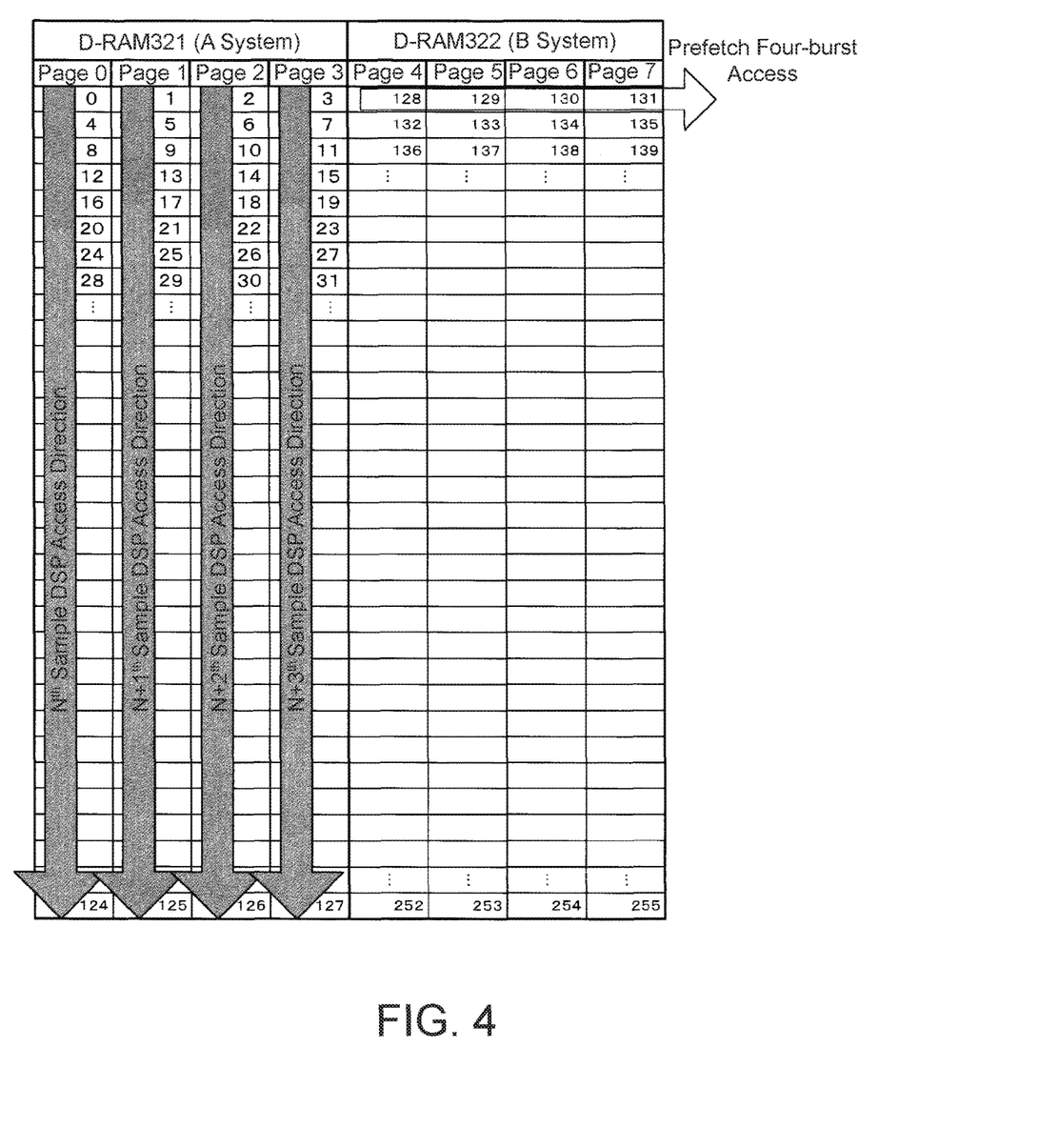
FIG. 4 is a drawing showing a relationship between page and burst access in a D-RAM (A system) 321 and a D-RAM (B system) 322.

Next, FIG. 4 is a drawing showing a relationship between page and burst access in the D-RAM (A system) 321 and the D-RAM (B system) 322. In order to embody the aforementioned burst access, in the present embodiment, as shown in FIG. 4, the D-RAM (A system) 321 is a DSP program buffer, the D-RAM (B system) 322 is a prefetch program buffer, and burst access is performed collectively for four samplings from the prefetch program buffer. Specifically, while page 0 to page 3 of the D-RAM (A system) 321 are being sequentially read in FIG. 4, for example, page 4 to page 7 of the D-RAM (B system) 322 are read all at once (prefetch four-burst access).

Specifically, the plurality of sampling data read out from the delay memory by the first controller, i.e., the sampling data respectively stored in the addresses A, A+1, A+2, and A+3, is stored in the D-RAM (A system) 321. For example, the sampling data accessed from address A is stored in the "0" area in page 0, the sampling data accessed from address A+1 is stored in the "1" area in page 1, the sampling data accessed from address A+2 is stored in the "2" area in page 2, and the sampling data accessed from address A+3 is stored in the "3" area in page 3. In a similar manner, the four data sequentially accessed from the delay memory are respectively written to pages 0 to 4.

When all of the data is written to the D-RAM (a system) 321 in this manner, the contents of the delay memory during the $N^{th}$ sampling timing will be written to the page 0 area, the contents during the N+1 sampling timing will be written to the page 1 area, the contents during the N+2 sampling timing will be written to the page 2 area, and the contents of the N+3 sampling timing will be written to the page 3 area.

The calculation unit 323 (processor) performs processing in this state in accordance with the data stored in the respective page areas. If this process is the delay feedback described above, the sampling data in the "0" area in page 0, for example, is read out and multiplied with a prescribed coefficient, and the product thereof is written to an area having a different delay time address from the "0" area in page 0. As shown in FIG. 3, this type of process is conventionally performed with an external delay memory, but in the present invention, an internal memory is used instead, which shortens the processing time.

The sampling data that has been processed and stored in the respective page areas in this manner, i.e., the four sampling data that are stored in the "0" of page 0, the "1" of page 1, the "2" of page 2, and the "3" of page 3, are read out from the D-RAM (A system) 321 by the second memory controller (described later) to the designated areas in the sequential addresses of the delay memory. The writing to the delay memory also takes less time than if the addresses were to be designated at random.

In the present embodiment, to further shorten the processing time, the D-RAM (B system) 322, which is the same as the D-RAM (A system) 321, is provided. In other words, when the first memory controller is writing data from the delay memory to the D-RAM (A system) 321, the second memory controller is writing data from the D-RAM (B system) 322 to the delay memory. This further reduces processing time.

Figure 5:
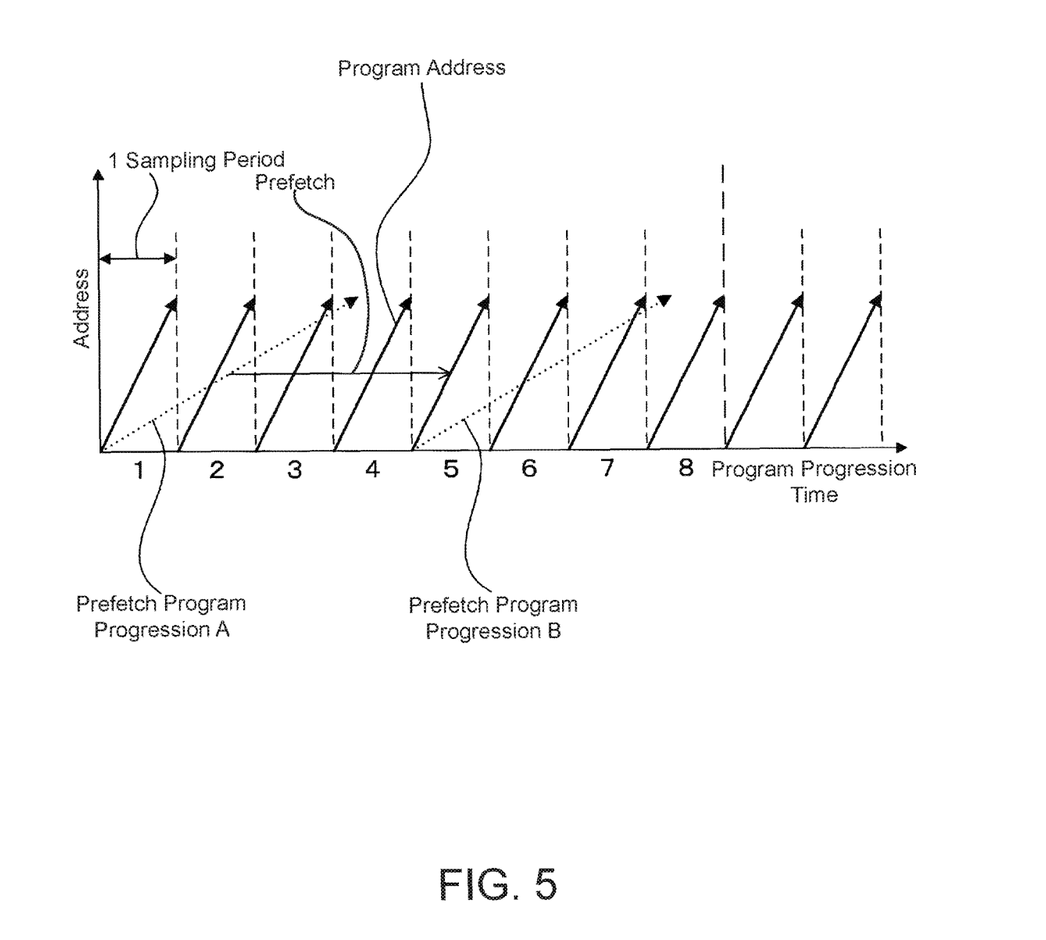
FIG. 5 is a drawing showing a relationship between a DSP program progression and a prefetch program progression.

Next, a relationship between a DSP program progression and a prefetch program progression will be described with reference to FIG. 5. As mentioned above, in the DSP program progression, four pieces of sample data are sequentially read from the D-RAM (A system) 321. This corresponds to program progression time "1" to "4" in FIG. 5. Then, while this program progression time "1" to "4" is progressing, a prefetch four-burst access is performed for the next four samplings "5" to "8" from the D-RAM (B system) 322 by a prefetch program progression A. Then, when the DSP program progression becomes "5" to "8," a prefetch four-burst access is performed by the next prefetch program progression B. Thereafter, by repeating the aforementioned, latency (delay) that occurs each time the external memory is accessed is avoided and a decline in performance is prevented.

Figure 6:
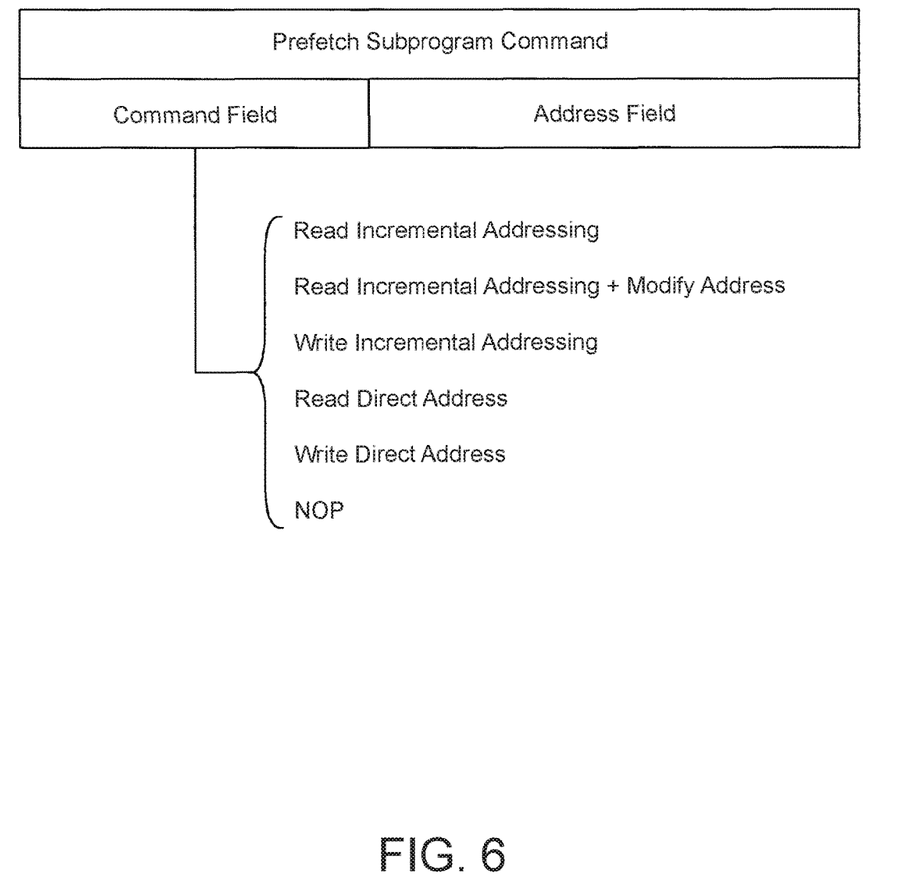
FIG. 6 is a drawing showing a configuration of a prefetch subprogram command.

Next, a prefetch subprogram command that defines the prefetch program progression will be described with reference to FIG. 6. As previously mentioned, the prefetch subprogram command is stored in the T-RAM 319 in the bridge B DRAM controller 318 (see FIG. 2), and is sequentially executed. The prefetch subprogram command is configured from a command field and an address field.

Any of "read increment addressing", "read increment addressing+modify address", "write increment addressing", "read direct address", "write direct address", and "no operation (NOP)" is set in the command field. An address value relating to a time for which a delay is to be implemented is set in the address field.

<Configuration of Bridge B DRAM Controller 318>

Figure 7:
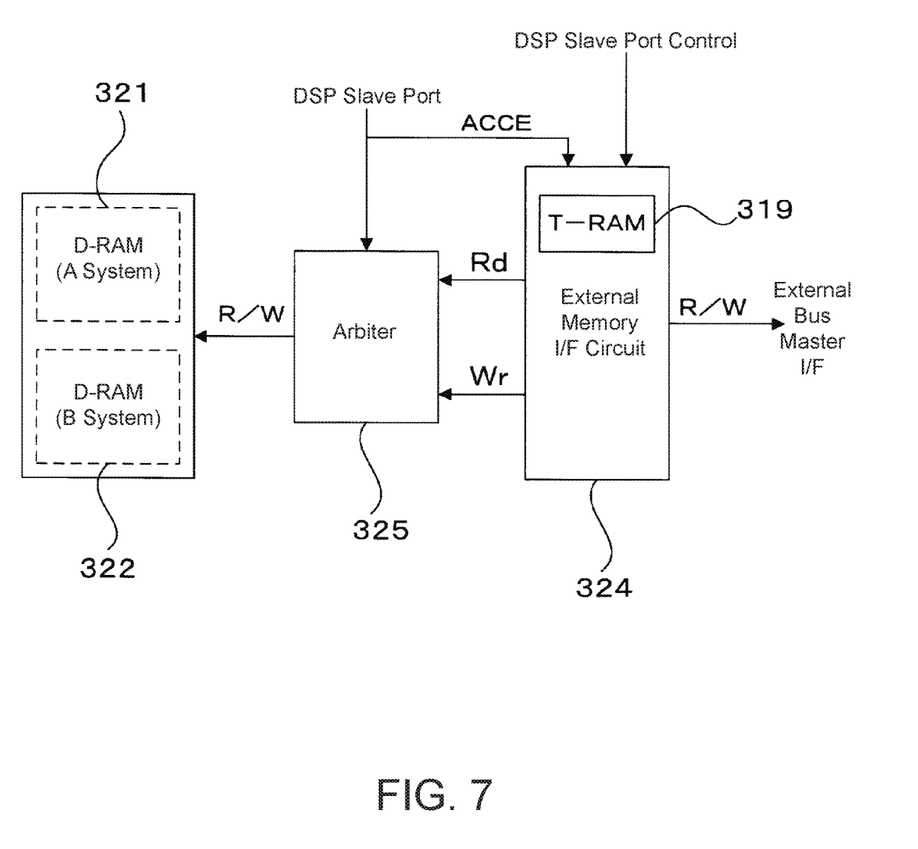
FIG. 7 is a block diagram showing a configuration of a bridge B DRAM controller 318.

Next, a configuration of the bridge B DRAM controller 318 will be described with reference to FIG. 7. The bridge B DRAM controller 318 is configured from an external memory interface 324 and an arbiter 325. The external memory interface 324 instructs a read/write to an external memory (E-RAM: DDR-SDRAM 40) by way of an external bus master interface, and instructs a read/write with respect to the arbiter 325, in accordance with a DSP slave port control signal and an access counter increment enable ACCE.

The arbiter 325 arbitrates in such a way that the D-RAM (A system) 321 and the D-RAM (B system) 322 perform read/write operations independently without causing interference to each other, in accordance with an access request (read/write) from the external memory interface 324. Specifically, a D-RAM access request through a DSP slave port is given highest priority, prefetch data is read from the external memory (E-RAM: DDR-SDRAM 40) at an available timing, and the data read from the D-RAM is written to the external memory (DDR-SDRAM 40).

<Configuration of External Memory Interface 324>

Figure 8:
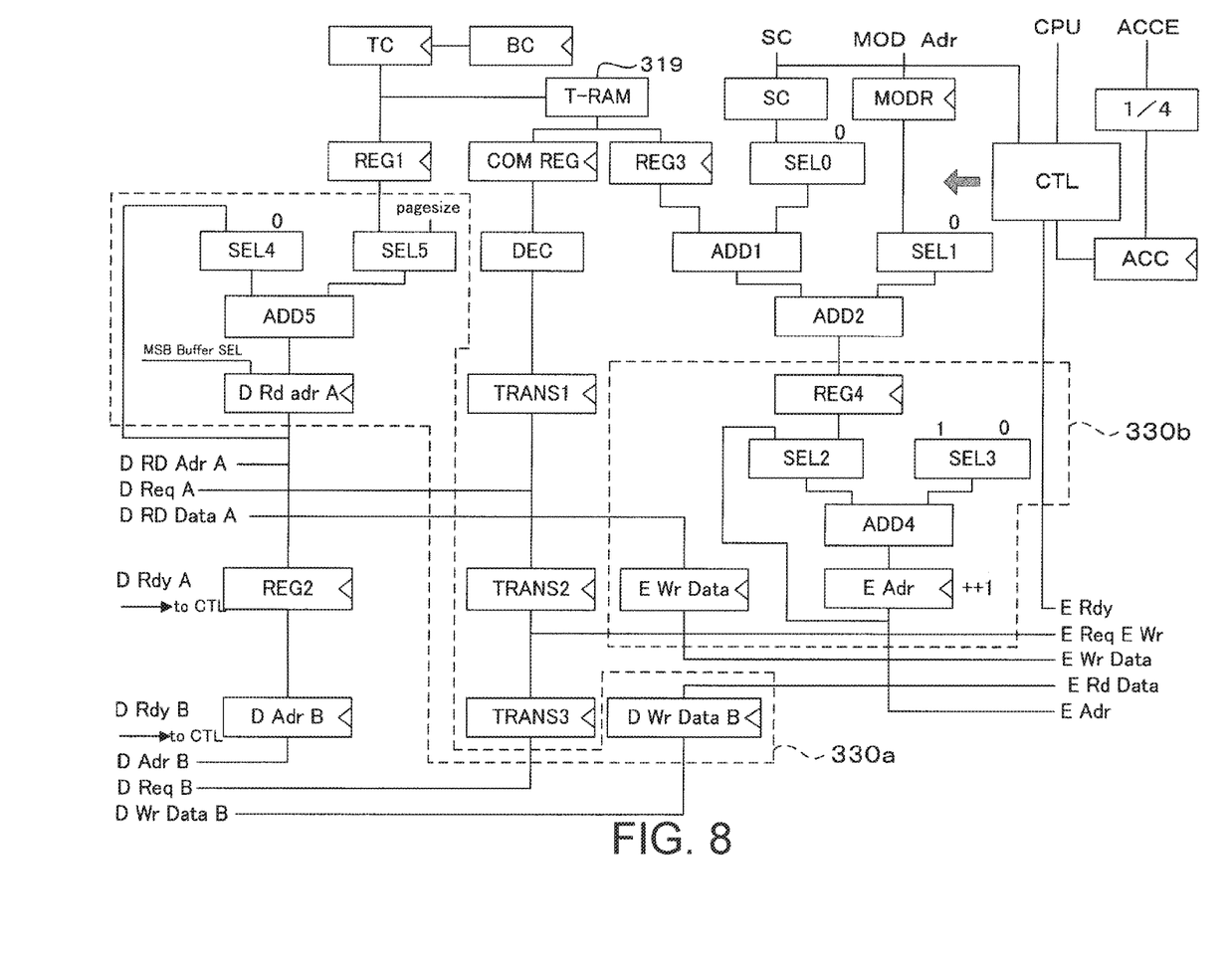
FIG. 8 is a block diagram showing a configuration of an external memory interface 324.

Next, a configuration of the external memory interface 324 will be described with reference to FIG. 8. In FIG. 8, a counter TC designates an address value of the T-RAM 319. A counter BC is a counter that counts the number of times that burst access is performed, and forms a low order of the counter TC. The counter TC is incremented each time the counter BC counts a burst.

In a register REG1, an address of the D-RAM (A system) 321 or the D-RAM (B system) 322 (hereinafter, referred to as a D-RAM address) is fetched. In other words, an address in a prefetch subprogram command designated by the T-RAM 319 (address value of the counter TC) is stored in the register REG1.

A selector SEL5 selects and outputs either the D-RAM address of the register REG1 or a "page size." A selector SEL4 selects and outputs either an output of an adder ADD5 or "0." The adder ADD5 generates the D-RAM address, which is obtained by adding the outputs of the selectors SEL4 and SEL5. That is, "0" or the "page size" is added to the D-RAM address of the register REG1, and a sequentially accessed address or a burst-accessed address is calculated. A register D Rd adr A fetches the output of the adder ADD5.

Note that an MSB buffer SEL provided in the register D Rd adr A selects the aforementioned D-RAM (A system) 321 or the D-RAM (B system) 322. A sequentially accessed address is used when the D-RAM (A system) 321 is selected, whereas a burst-accessed address is used when the D-RAM (B system) 322 is selected.

A register REG2 retains a signal D Rdy A supplied from a controller CTL. Data D Rd Data A that is read according to an address of the register D Rd adr A is written to the external memory (DDR-SDRAM 40) as data E Wr Data by way of a register E Wr Data.

A command register COM REG fetches the prefetch subprogram command of the T-RAM 319. A register REG3 fetches the address in the prefetch subprogram command of the T-RAM 319. A decoder DEC decodes the prefetch subprogram command fetched by the command register COM REG, and a thus obtained access command is retained in transistors TRANS1 to TRANS3.

A sampling counter SC counts and outputs the number of samplings. A register MODR retains an address modulation value. A selector SEL0 selects and outputs either "0" or the number of samplings. An adder ADD1 adds the output of the selector SEL0 to the address in the prefetch subprogram command of the register REG3. A selector SEL1 selects and outputs either "0" or the address modulation value. An adder ADD2 selects and outputs either the output of the adder ADD1 or the output of the selector SEL1.

In this way, from the sampling counter SC to the adder ADD2, stepping is performed with the number of samplings being added to the address in the prefetch subprogram command of the register REG3, or stepping is performed with the address modulation value being added in addition, in accordance with selector control implemented by the controller CTL. The stepped address in the prefetch subprogram command is retained in a register REG4.

A selector SEL3 selects and outputs either "1" or "0." A selector SEL2 selects and outputs either the output of a register E Adr or the address of the register REG4. An adder ADD4 generates an address obtained by adding the outputs of the selectors SEL2 and SEL3. The register E Adr increments the address calculated by the adder ADD4 to generate an address E Adr of the external memory (DDR-SDRAM 40).

Data E Rd Data that is read from the external memory in accordance with the address E Adr is written to the D-RAM as data D Wr Data B by way of a register D Wr Data B. The write address therefore is set in a register D Adr B from a controller CTL.

A ¼ circuit reduces the access count of the access counter increment enable ACCE to ¼, and generates a one-time access enable at each fourth sampling access cycle. An access counter ACC increments the access count in accordance with the access enable generated by the ¼ circuit, and meanwhile decrements the access count in accordance with a decrement enable DECE supplied from the controller CTL side.

<Operation of External Memory Interface 324>

Figure 9:
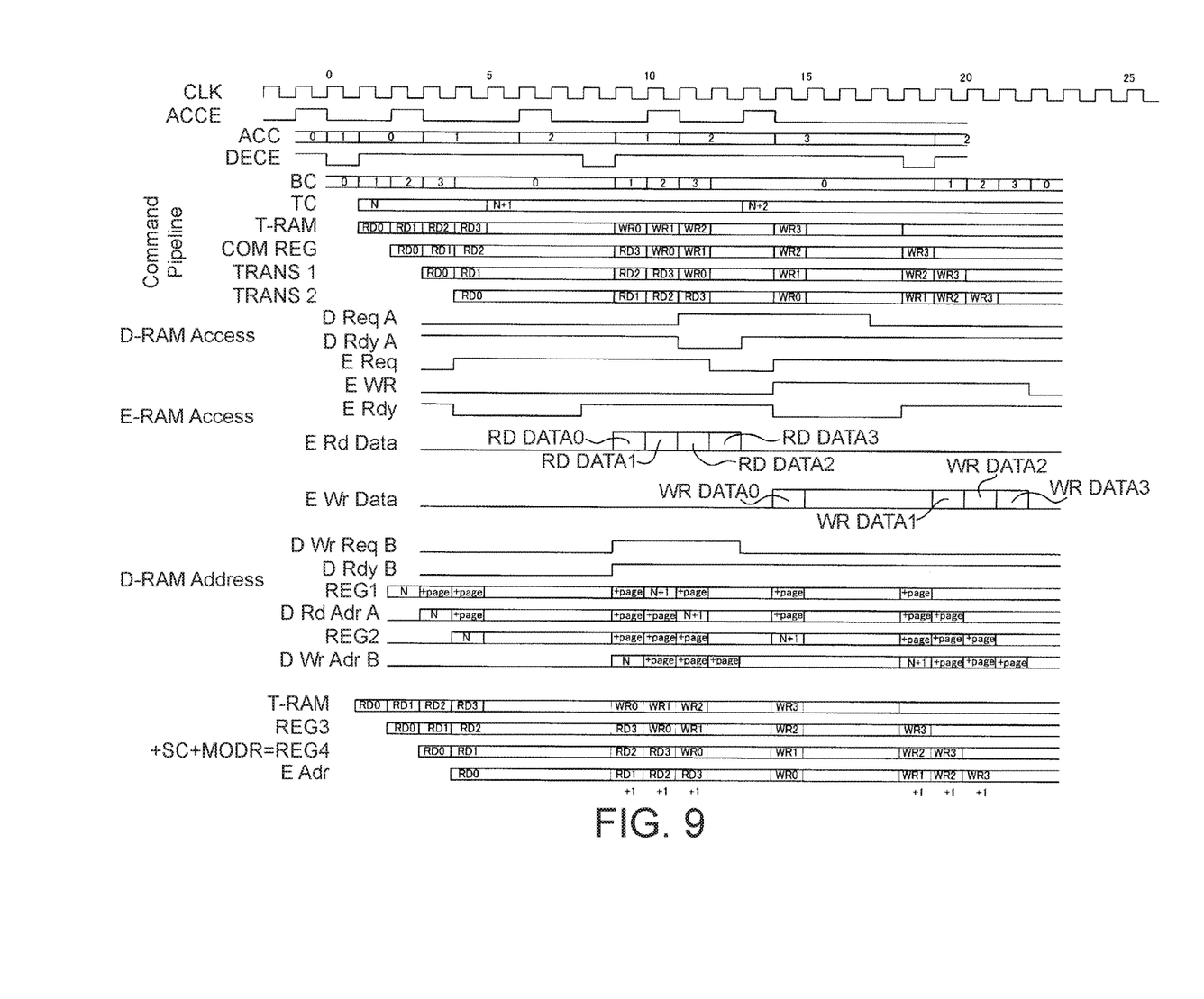
FIG. 9 is a timing chart showing an operation of the external memory interface 324.

Next, an operation will be described with reference to a timing chart for the external memory interface 324 shown in FIG. 9. Hereinafter, an operation of the external memory interface 324 will be described corresponding to the phases of a clock CLK. In the external memory interface 324, an access operation is started with the access counter ACC not being "0" and there being no command in the register COM REG as the starting point.

First, at a clock "1" phase, when the counter BC starts incrementing corresponding to the access counter ACC not being "0," a first command RD0 of the T-RAM 319 enters the pipeline. Thereafter, in accordance with the incrementing of the counter BC, commands RD1, RD2, and RD3 of the T-RAM 319 are issued for a burst.

Meanwhile, in the D-RAM address pipeline, an address value N of the counter TC is copied, and then an address obtained by the page address+page being added is issued and retained in the register D Rd adr A.

In a T-RAM address field, +SC+MODR are added in the pipeline from the register REG3, and the address of the external memory (DDR-SDRAM 40) is thereby calculated. An access request is asserted by a register TRANS2 with respect to the external memory; however, a signal E Rdy is deasserted from outside. Therefore, a wait occurs at clocks "5" to "9."

Then, when the signal E Rdy is asserted and execution is started once again, read data E Rd Data (RD DATA0, RD DATA1, RD DATA2, and RD DATA3) from the external memory (DDR-SDRAM 40: E-RAM) is stored in the register D Wr Data B and becomes data (RD DATA0, RD DATA1, RD DATA2, and RD DATA3) to be written to the D-RAM.

Next, from a clock "10" phase, a write to the external memory is performed from the D-RAM. When a write to the external memory is performed, it is necessary to read the data to be written from the D-RAM side. Therefore, a signal D Req A is asserted at clock "12"; however, at this timing (rise of clock "12"), there is a conflict with the earlier write to the D-RAM, and therefore the signal D Rdy A is deasserted and a wait occurs at clocks "12" and "13".

Then, as soon as the signal D Rdy A is asserted, read data D RD Data (WR DATA0, WR DATA1, WR DATA2, and WR DATA3) from the D-RAM is stored in the register E Wr Data and sequentially written to the external memory (E-RAM: DDR-SDRAM 40).

In this connection, in this process of writing to the external memory, at clocks "15" to "18", a wait state occurs due to the signal E Rdy being deasserted. When this type of wait in the writing process occurs in the DSP program progression, such a state results in a decline in processing; however, the influence thereof can be avoided in the aforementioned prefetch program progression due to a prefetch four-burst access being performed.

A first memory controller 330a of the invention of the present application is configured from the SEL4, the SEL5, the ADD5, the D Rd adr A, and the D Wr Data B in FIG. 8, and a second memory controller is configured from the REG4, the SEL2, the SEL3, the ADD4, the E Adr, and the E Wr Data.

As mentioned above, in the present embodiment, a double buffer (four pages×2 system) constituted of a DSP program buffer and a prefetch program buffer is provided, and burst access is performed collectively for four samplings from the prefetch program buffer, thereby making it possible to avoid a decline in performance caused by latency (delay) that occurs each time the external memory is accessed. Furthermore, by removing the influence of latency (delay) that occurs each time the external memory is accessed, the processing capacity of the DSP itself is improved, and it also becomes possible to increase the number of effects that can be processed at the same time. In addition, as a result of a decrease in a bus occupancy rate due to the improvement in the processing capacity of the DSP, an improvement in the overall processing capacity of the musical instrument system can also be anticipated.

Furthermore, it is also possible for the functions of the signal processing device according to the invention of the present application to be realized in the processing of a computer by a software program.

An embodiment of the present invention has been described hereinabove; however, the present invention is not restricted thereto and is included within a scope that corresponds to the invention described in the claims of the present application and equivalents thereof.

What is claimed is:

1. A signal processing device, comprising:
a first memory controller that reads a plurality of sampling data stored in respective sequential addresses in a first memory, in the order of the addresses, and writes each of the plurality of read sampling data to respective sequential addresses in a second memory, in a sequential order;
a processing unit that processes the plurality of sampling data written in the second memory, and writes the plurality of processed sampling data to the second memory; and
a second memory controller that reads the plurality of processed sampling data written in the second memory, and writes each of the plurality of read sampling data to the respective sequential addresses in the first memory, in a sequential order,
wherein the second memory includes a plurality of page areas in which the plurality of sampling data are divided and stored according to respective sampling periods.

2. The signal processing device according to claim 1, wherein the first memory controller reads the plurality of sampling data that is stored in first regions respectively designated by sequential addresses in the first memory, and
wherein the second memory controller writes the plurality of sampling data that is read from the second memory to second regions respectively designated by sequential addresses in the first memory.

3. The signal processing device according to claim 1, wherein the processing unit, in accordance with respective sampling periods, processes the plurality of sampling data that is written in the second memory.

4. The signal processing device according to claim 1, further comprising:
a delay processing unit that executes delay processing on the data stored in the second memory,
wherein the first memory has a ring buffer shape.

5. The signal processing device according to claim 1, wherein the signal processing device has the first memory externally attached thereto and the second memory internally provided therein.

6. The signal processing device according to claim 1, further comprising:
an external memory as the first memory; and
a bus that connects the external memory to the processing unit,
wherein the processing unit includes:
an internal memory, as the second memory.

7. A signal processing device, comprising:
a first memory controller that reads a plurality of sampling data stored in respective sequential addresses in a first memory, in the order of the addresses, and writes each of the plurality of read sampling data to respective sequential addresses in a second memory, in a sequential order;
a processing unit that processes the plurality of sampling data written in the second memory, and writes the plurality of processed sampling data to the second memory; and
a second memory controller that reads the plurality of processed sampling data written in the second memory, and writes each of the plurality of read sampling data to the respective sequential addresses in the first memory, in a sequential order
wherein the processing unit, in accordance with respective sampling periods, reads and processes data located in page areas corresponding to the respective sampling periods, and writes the data that has been processed to the page areas that have been read.

8. A method of processing a signal in a signal processing device, the method comprising:
reading a plurality of sampling data stored in respective sequential addresses in a first memory, in the order of the addresses, and writing each of the plurality of read sampling data to respective sequential addresses in a second memory, in a sequential order;
processing the plurality of sampling data written in the second memory and writing the plurality of processed sampling data to the second memory; and
reading the plurality of processed sampling data written in the second memory, and writing each of the plurality of read sampling data to the respective sequential addresses in the first memory, in a sequential order
wherein the second memory includes a plurality of page areas in which the plurality of sampling data are divided and stored according to respective sampling periods.

9. A non-transitory storage medium that can be read from and written to by a computer used as a signal processing device, the non-transitory storage medium having stored therein a program that causes the computer to execute the following:
reading a plurality of sampling data stored in respective sequential addresses in a first memory, in the order of the addresses, and writing each of the plurality of read sampling data to respective sequential addresses in a second memory, in a sequential order;
processing the plurality of sampling data written in the second memory and writing the plurality of processed sampling data to the second memory; and
reading the plurality of processed sampling data written in the second memory and writing each of the plurality of read sampling data to the respective sequential addresses in the first memory, in a sequential order,
wherein the second memory includes a plurality of page areas in which the plurality of sampling data are divided and stored according to respective sampling periods.

10. An electronic musical instrument, comprising:
a performance operation element that receives performance data;
first and second memories;
a sound source that generates data relating to musical sound waveforms in respective sampling periods based on the performance data; and
the signal processing device according to claim 1, the signal processing device receiving data from the sound source.

11. A signal processing device, comprising:
a first memory controller that reads data from a first memory that is storing, in a discrete address order, a plurality of data that are to be processed sequentially for each sampling period, the first memory controller reading at once a plurality of data for a plurality of sampling periods stored in sequential plural addresses in the first memory, the first memory controller further writing said read plurality of data for the plurality of sampling periods in a second memory;
a processing unit that processes the plurality of data for the plurality of sampling periods written in the second memory in the order in which the plurality of data for the plurality of sampling periods should be processed in the respective sampling periods.

12. The signal processing device according to claim 11, wherein the first memory controller reads at once said plurality of data for the plurality of sampling periods and writes said read plurality of data for the plurality of sampling periods in the second memory, before the processing unit starts processing the plurality of data for the plurality of sampling periods, and
wherein the signal processing device further comprises a second memory controller that, after the processing unit finishes processing the plurality of data for the plurality of sampling periods, reads out the processed plurality of data for the plurality of sampling periods in the second memory and writes said read plurality of data for the plurality of sampling periods at original addresses in the first memory.

13. The signal processing device according to claim 11, wherein said first memory is configured such that read/write speeds of data in a discrete address order are higher than read/write speeds of data in a sequential address order, and
wherein said second memory is configured such that read/write speeds of data in a discrete address order is higher than the read/write speeds of data in a discrete address order of the first memory.

14. The signal processing device according to claim 11, wherein in each sampling period, the processing unit processes, in a discrete address order, the plurality of data that are stored in the first memory in the discrete address order so as to perform a delay processing.

15. The signal processing device according to claim 11, wherein the plurality of data that are to be processed sequentially for each sampling period is stored in the first memory in the discrete address order, and data for one sampling period are stored at addresses that are shifted from addresses at which data for another sampling period are stored, and
wherein the processing unit reads and writes the plurality of data that are stored discretely in the first memory to correspond to respective sampling periods while shifting addresses of data stored in the first memory by a sampling period so as to perform a delay processing that corresponds to the respective sampling period.

* * * * *